UNITED STATES PATENT OFFICE.

JOSEPH TURNER AND HARRY DEAN, OF HUDDERSFIELD, ENGLAND.

MANUFACTURE OF BLACK COLORING-MATTERS.

1,014,983.　　　　　Specification of Letters Patent.　　Patented Jan. 16, 1912.

No Drawing.　　Application filed April 24, 1911. Serial No. 622,910.

*To all whom it may concern:*

Be it known that we, JOSEPH TURNER and HARRY DEAN, subjects of King George V of Great Britain, residing at Huddersfield, in the county of York, England, have invented certain new and useful Improvements in the Manufacture of Black Coloring-Matters, of which the following is a specification.

This invention relates to the manufacture of direct cotton dyestuffs, in investigating which we have found that the use of certain chlor derivates of aromatic amins yield valuable black dyestuffs.

In the production of direct dyeing cotton dyestuffs according to our invention, we combine one molecule of the neutral salt of amido naphthol disulfonic acid (1.8.3.6) (H acid) with one molecule of tetrazotized benzidin, taking care that throughout the re-action a slight excess of mineral acid remains present. When the combination is completed, the intermediate product is rendered alkaline with sodium carbonate and a diazo solution from one molecule of ortho or para chlor anilin is run in. A deep blue black body forms at once and is complete when all diazo chlor benzidin has disappeared. There is then further added one molecule of chlor meta phenylene diamin 1:2:4.

As an example of the production of the coloring matter, we give the following:— 184 parts of benzidin are tetrazotized in the well-known manner and combined with a neutral solution prepared from 341 parts of the acid sodium salt of amido naphthol disulfonic acid (1.8.3.6) (H acid) When the combination is complete, the mixture is made alkaline with sodium carbonate, and a solution of para chlor diazo benzole from 128 parts para chlor anilin is quickly added. The intermediate product which forms almost immediately is then further combined with a solution of 143 parts of chlor meta phenylene diamin 1:2:4. The dyestuff is isolated in the usual manner, and dyes vegetable fibers fine deep black shades.

We may replace the benzidin in the above example by other para diamins such as tolidin or dianisidin.

Having thus described our invention, what we claim as new and desire to secure by Letters Patent is:—

1. A process for manufacturing a dyestuff which consists in combining one molecule of a tetrazotized para diamin with one molecule of amido naphthol disulfonic acid (1.8.3.6) (H acid) in slightly mineral acid solution, then combining the intermediate body thus obtained with one molecule of a diazo chlor benzole, and finally adding one molecule of chlor meta phenylene diamin 1:2:4.

2. A process for manufacturing a dyestuff which consists in combining one molecule of tetrazotized benzidin with one molecule of amido naphthol disulfonic acid (1.8.3.6) (H acid) in slightly mineral acid solution, then combining the intermediate body thus obtained with one molecule of a diazo chlor benzole, and finally adding one molecule of chlor meta phenylene diamin 1:2:4.

In testimony whereof we affix our signatures in the presence of two witnesses.

JOSEPH TURNER.
HARRY DEAN.

Witnesses:
　FREDERICK I. BRIGHT,
　THOMAS H. BARRON.